(12) United States Patent
Nagorny et al.

(10) Patent No.: US 7,941,629 B2
(45) Date of Patent: May 10, 2011

(54) MEMORY REGISTRATION CACHING

(75) Inventors: Denis V. Nagorny, Sarov (RU);
Alexander V. Supalov, Erftstadt (DE)

(73) Assignee: Intel Corporation, Santa Clara, CA (US)

( * ) Notice: Subject to any disclaimer, the term of this patent is extended or adjusted under 35 U.S.C. 154(b) by 488 days.

(21) Appl. No.: 12/038,960

(22) Filed: Feb. 28, 2008

(65) Prior Publication Data
US 2009/0222638 A1    Sep. 3, 2009

(51) Int. Cl.
G06F 12/02    (2006.01)
G06F 13/00    (2006.01)

(52) U.S. Cl. ......... 711/170; 711/100; 711/118; 711/154

(58) Field of Classification Search .................. 711/170, 711/100, 117, 118, 154
See application file for complete search history.

(56) References Cited

OTHER PUBLICATIONS

Memory Registration Caching Correctness; Wyckoff et al.; 2005.*
Rootkits: Subverting the Windows Kernel; Hoglund et al; 2006.*
kDAPL: Kernel Direct Access Programming Library; DAT collaborative; Jan. 5, 2007.*

* cited by examiner

*Primary Examiner* — Tuan V. Thai
(74) *Attorney, Agent, or Firm* — Garrett IP, LLC; Patrick E. Garrett

(57) ABSTRACT

A method for memory registration caching comprising enumerating a first process for a first process, in response to a memory registration cache being activated; finding an import table for the first module, wherein one or more pointers, in the import table, refer to memory management routines in a first library; changing the pointers so that the pointers refer to memory management routines in a second library; overloading routines that refer to the memory management routines in the first library so that the routines refer to the memory management routines in the second library; intercepting memory allocation requests, wherein the size of the request is forwarded to the memory registration cache; and de-registering freed memory from the memory registration cache.

16 Claims, 3 Drawing Sheets

MEMORY REGISTRATION CACHING

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present disclosure relates generally to memory registration in a computing environment, and more particularly to memory registration caching in an operating system based on intercepting memory management calls.

BACKGROUND

An application may send and receive messages over a network, allocating memory as needed through memory registration. Memory registration causes an operating system to allocate memory for the application and provide address translation for the network's interface card (NIC), reserving the memory until the memory is no longer needed by the application (i.e., when the allocated memory is de-registered).

Particularly, in high-speed networks (e.g., Infiniband, Myrinet), memory registration and de-registration operations are slow compared to other network operations, such as high-speed data transfers. Therefore, a caching scheme may be implemented to increase network performance by reducing the number of memory registration and de-registration operations that would be otherwise necessary.

In certain operating systems (e.g., the Microsoft® Windows operating system), in order to take advantage of the caching, the operating system has to rebuild the target application, by explicitly importing each external variable and bounding each variable to the dynamic library that declares that variable. Since a substantial amount of overhead is associated with rebuilding the application, the performance benefits associated with the above-noted caching scheme are effectively rendered worthless.

For the above reasons, systems and methods are needed that can facilitate a memory registration caching scheme that automatically monitors memory management in an operating system without having to rebuild the target application.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

The present invention is directed to methods and systems for memory registration caching based on intercepting memory management calls.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for memory registration caching is provided. The method comprises enumerating a first module for a first process, in response to a memory registration cache being activated; finding an import table for the first module, wherein one or more pointers, in the import table, refer to memory management routines in a first library; changing the pointers so that the pointers refer to memory management routines in a second library; overloading routines that refer to the memory management routines in the first library so that the routines refer to the memory management routines in the second library; intercepting memory allocation requests, wherein the size of the request is forwarded to the memory registration cache; and de-registering freed memory from the memory registration cache.

In accordance with another embodiment, a computer program product comprising a computer useable medium having a computer readable program is provided. The computer readable program when executed on a computer causes the computer to perform the functions and operations associated with the above-disclosed methods. In accordance with yet another embodiment, a system comprising one or more logic units is provided. The one or more logic units are configured to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

Figure 1:
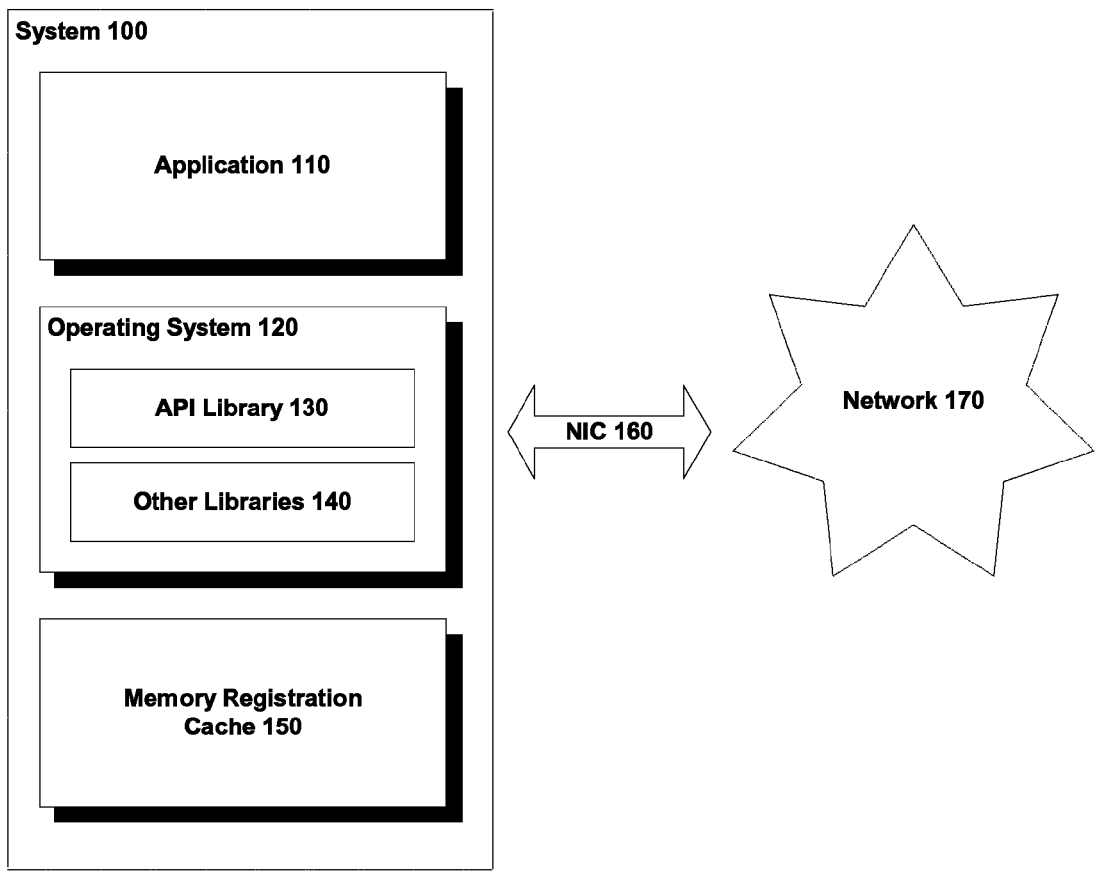
FIG. 1 is a block diagram of an exemplary computing environment for providing memory registration caching based on call interception, in accordance with one embodiment.

Referring to FIG. 1, in accordance with one embodiment, exemplary system 100 may comprise application 110, operating system 120, and memory registration cache 150. Operating system 120 may comprise an application program interface (API) library 130 and other libraries 140. System 100 may be connected to network 170 by way of network interface card (NIC) 160.

An API is a specification that allows two programs to communicate with each other. API library 130 may comprise a set of routines, protocols, or tools for building an application that is able to communicate with operating system 120. Application 110 may call routines in API library 130 to request services from operating system 120, for example.

Other libraries 140 may comprise a message passing interface (MPI) library. MPI is a language-independent communication standard commonly implemented in computing systems with parallel processing capabilities. The MPI library may comprise API routines that allow one process to communicate with another process that is running at the same time. Application 110 may send and receive messages to another application in another computing system (not shown) over network 170 using MPI library 140, for example.

In one embodiment, other libraries 140 may also comprise a network communication interface library (e.g., direct access programming library—DAPL). A network communication interface library may allow an application to run on different types of network fabrics (e.g., Infiniband, Myrinet). Application 110 may be compatible with networks (not shown) other than network 170, for example.

It is noteworthy that, in the following, one or more concepts or embodiments may be disclosed as related to or as applicable to the Windows operating system. Such references are by way of example, however; and as such, this disclosure and the concepts disclosed herein may be equally applicable to any other type of operating system or system architecture, in accordance with other embodiments or depending on implementation.

Figure 2:
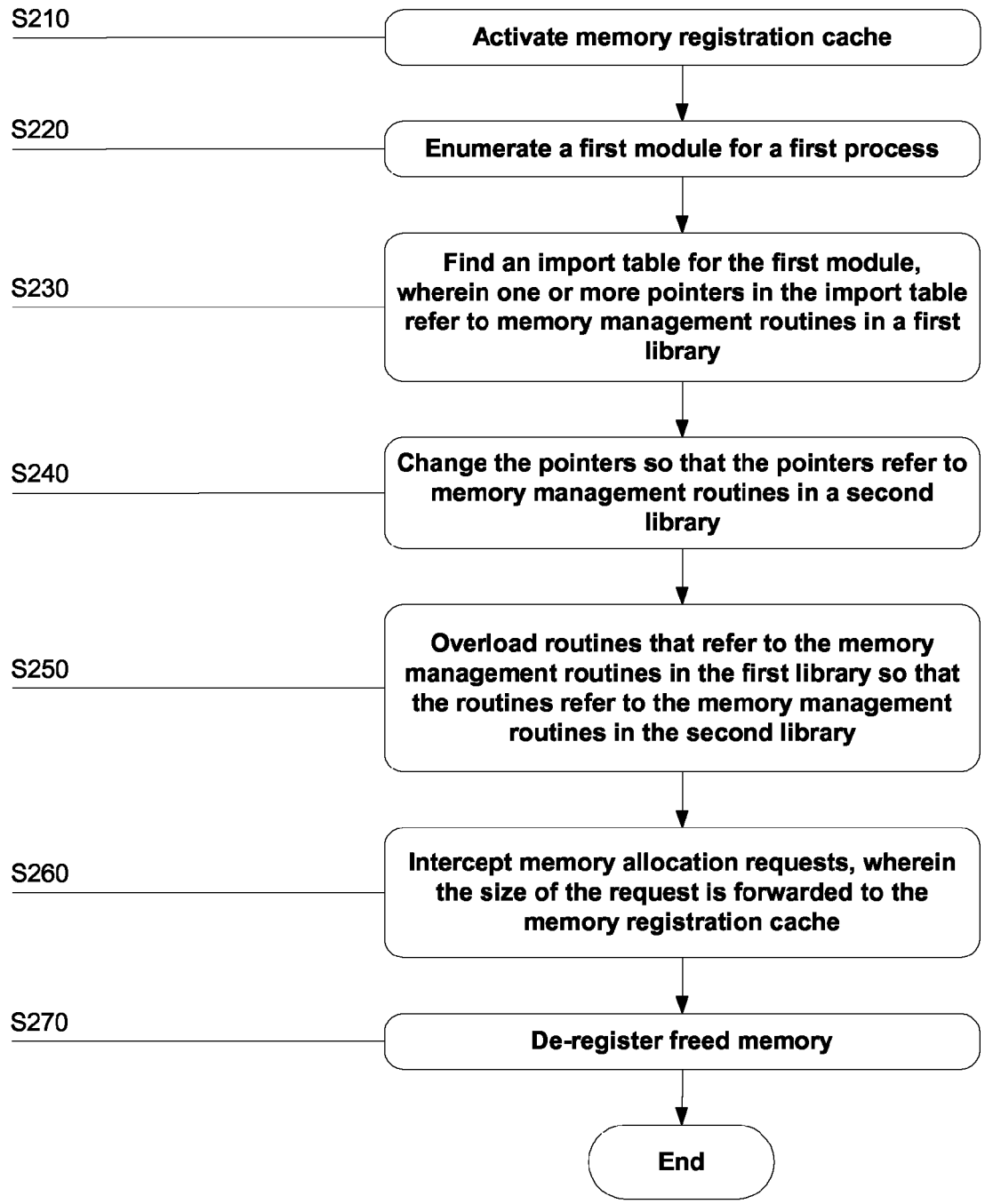
FIG. 2 is a flow diagram of an exemplary method for memory registration caching based on intercepting memory management calls, in accordance with one embodiment.

Referring to FIGS. 1 and 2, in accordance with one embodiment, memory management calls initially refer to a first library (e.g., Windows API library 130). When memory registration cache 150 is activated (S210), a second library (e.g., MPI library 140) enumerates, or lists, the modules of a first process that is loaded (S220). For each module, the library finds the module's import table (S230), which contains pointers to API routines, and changes one or more pointers so that the pointers refer to memory management routines in the second library (e.g., MPI library 140) instead of the first library (e.g., Windows API library 130) (S240).

The second library (e.g., MPI library 140) overloads routines that refer to the memory management routines in the first library (e.g., Windows API library 130) so that the routines refer to the memory management routines in the second library (e.g., MPI library 140) (S250). [Moved up]

When application 110 requests memory to be allocated, the second library (e.g., MPI library 140) intercepts the request and forwards the size of memory requested to memory registration cache 150, thereby performing memory registration (S260). Memory registration cache 150 uses the size information to de-register the allocated memory when the memory is freed (S270).

Figure 3:
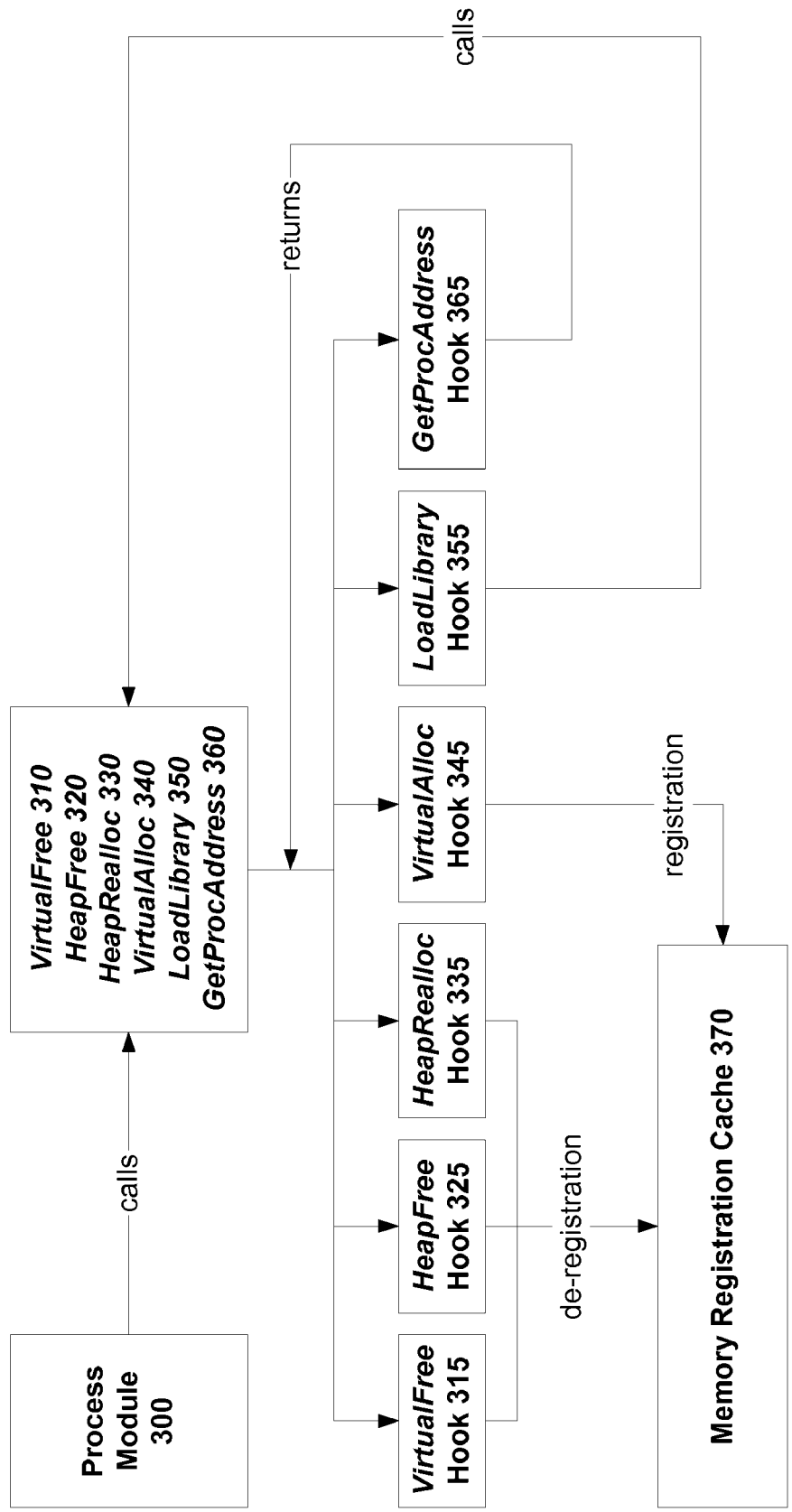
FIG. 3 is a flow diagram illustrating call interception of memory management functions, in accordance with one embodiment.

Referring to FIG. 3, in accordance with one embodiment, once the algorithm provided in FIG. 2 is applied, process module 300 may call one or more memory management routines. Since the pointers have been changed, if, for example, process module 300 calls an API routine (e.g., VirtualFree 310, HeapFree 320, HeapRealloc 330, or VirtualAlloc 340) from the first library (e.g., Windows API library), a corresponding API routine (e.g., VirtualFree hook 315, HeapFree hook 325, HeapRealloc hook 335, or VirtualAlloc hook 345) from the second library (e.g., MPI library) will be called instead.

If, process module 300 calls a memory routine that allocates memory (e.g., VirtualAlloc hook 345), for example, the registration routine for memory registration cache 370 will also be called. If process module 300 calls a memory routine that frees memory (e.g., VirtualFree hook 315, HeapFree hook 325, or HeapRealloc hook 335), for example, the de-registration routine for memory registration cache 370 will also be called.

If, for example, process module 300 attempts to load a dynamic library (e.g., by calling LoadLibrary 350), a corresponding API routine (e.g., LoadLibrary hook 355) from the second library (e.g., MPI library) will be called instead. If, for example, process module 300 attempts to directly obtain a process' address (e.g., by calling GetProcAddress 360), a corresponding API routine (e.g., GetProcAddress hook 365) from the second library (e.g., MPI library) will be returned instead.

In one embodiment, the changed pointers and the overloaded routines may be restored to their original state so that the changed pointers and the overloaded routines may be referenced by a third library (e.g., DAPL), if the restoring occurs after the third library's finalization.

Depending on implementation, it is possible that the present invention can take the form of an entirely hardware embodiment, an entirely software embodiment or an embodiment containing both hardware and software elements. A software embodiment may include, but not be limited to, to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices (including but not limited to keyboards, displays, pointing devices, etc.) can be coupled to the system either directly or through intervening I/O controllers. Network adapters (e.g., modem, cable modem, Ethernet cards) may also be coupled to the system to enable the data processing system to become coupled to other data processing systems or remote printers or storage devices through intervening private or public networks.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections of buried interconnections).

In any case, the chip is then integrated with other chips, discrete circuit elements, and/or other signal processing devices as part of either (a) an intermediate product, such as a motherboard, or (b) and end product. The end product can be any product that includes integrated circuit chips, ranging from toys and other low-end applications to advanced computer products having a display, a keyboard or other input device, and a central processor.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method comprising:
enumerating a first module of a first process, in response to a memory registration cache being activated;
finding an import table for the first module, wherein one or more pointers, in the import table, refer to memory management routines in a first library;
changing the pointers so that the pointers refer to memory management routines in a second library;
overloading routines that refer to the memory management routines in the first library so that the routines refer to the memory management routines in the second library;
intercepting memory allocation requests, wherein the size of the request is forwarded to the memory registration cache; and
de-registering freed memory from the memory registration cache.

2. The method of claim 1, further comprising restoring the changed pointers and the overloaded routines to their original state so that the changed pointers and the overloaded routines may be referred to by a third library, wherein the restoring occurs after finalization of the third library.

3. The method of claim 2, wherein the third library comprises a direct access programming library (DAPL).

4. The method of claim 1, wherein the first library comprises an application programming interface library.

5. The method of claim 1, wherein the second library comprises a message passing interface library.

6. A computer program product comprising a computer useable medium having a computer readable program, wherein the computer readable program when executed on a computer causes the computer to:
enumerate a first module of a first process, in response to a memory registration cache being activated;
find an import table for the first module, wherein one or more pointers in the import table refer to memory management routines in a first library;
change the pointers so that the pointers refer to memory management routines in a second library;
overload routines that refer to the memory management routines in the first library so that the routines refer to the memory management routines in the second library; and
intercept memory allocation requests, wherein the size of the request is forwarded to the memory registration cache.

7. The computer program product of claim 6 that further causes the computer to de-register freed memory from the memory registration cache.

8. The computer program product of claim 6 that further causes the computer to restore the changed pointers and the overloaded routines to their original state so that the changed pointers and the overloaded routines may be referred to by a third library, wherein the restoring occurs after finalization of the third library.

9. The computer program product of claim 8, wherein the third library comprises a direct access programming library (DAPL).

10. The computer program product of claim 6, wherein the first library comprises an application programming interface library.

11. The computer program product of claim 6, wherein the second library comprises a message passing interface library.

12. A system comprising:
a storage medium to store executable instructions; and
a processor architecture to execute the instructions to cause the system to:
enumerate a first module for a first process, in response to a memory registration cache being activated;
find an import table for the first module, wherein one or more pointers, in the import table, refer to memory management routines in a first library;
change the pointers so that the pointers refer to memory management routines in a second library;
overload routines that refer to the memory management routines in the first library so that the routines refer to the memory management routines in the second library;
intercept memory allocation requests, wherein the size of the request is forwarded to the memory registration cache; and
de-register freed memory from the memory registration cache.

13. The system of claim 12, wherein the processor architecture further causes the system to restore the changed pointers and the overloaded routines to their original state so that the changed pointers and the overloaded routines may be referred to by a third library after finalization of the third library.

14. The system of claim 13, wherein the third library comprises a direct access programming library (DAPL).

15. The system of claim 12, wherein the first library comprises an application programming interface library.

16. The system of claim 12, wherein the second library comprises a message passing interface library.

* * * * *